United States Patent
Clarke et al.

(10) Patent No.: US 12,487,744 B2
(45) Date of Patent: Dec. 2, 2025

(54) THROTTLING NAND READ-OUTS FOR IMPROVED HOST READ PERFORMANCE

(71) Applicant: Kioxia Corporation, Tokyo (JP)

(72) Inventors: Brian Clarke, Berks (GB); Nigel Horspool, Great Missenden (GB)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/595,366

(22) Filed: Mar. 4, 2024

(65) Prior Publication Data
US 2025/0278191 A1    Sep. 4, 2025

(51) Int. Cl.
     *G06F 12/00*      (2006.01)
     *G06F 3/06*      (2006.01)

(52) U.S. Cl.
CPC .......... *G06F 3/0611* (2013.01); *G06F 3/0659* (2013.01); *G06F 3/0679* (2013.01)

(58) Field of Classification Search
CPC ..... G06F 3/0611; G06F 3/0659; G06F 3/0679
USPC ......................................................... 711/103
See application file for complete search history.

(56) References Cited

U.S. PATENT DOCUMENTS

| | | | | |
|---|---|---|---|---|
| 8,725,931 B1* | 5/2014 | Kang | .................. | G06F 12/0246 710/52 |
| 10,158,574 B2* | 12/2018 | Katevenis | ............... | H04L 47/22 |
| 2005/0198459 A1* | 9/2005 | Bogin | ....................... | G06F 5/06 711/167 |
| 2008/0059706 A1* | 3/2008 | Aigo | .................... | G06F 12/0804 711/E12.04 |
| 2012/0059960 A1* | 3/2012 | Cheruel | .................. | H04L 47/25 710/107 |
| 2017/0160953 A1* | 6/2017 | Hirata | ................... | G06F 3/0679 |
| 2020/0089618 A1* | 3/2020 | Kim | ..................... | G06F 12/0246 |
| 2020/0319890 A1* | 10/2020 | Compton | ............ | G06F 11/1484 |
| 2021/0303199 A1* | 9/2021 | Horspool | ............. | G06F 3/0614 |
| 2023/0114146 A1* | 4/2023 | Desai | ..................... | G06F 3/061 711/154 |

* cited by examiner

*Primary Examiner* — Mohamed M Gebril
(74) *Attorney, Agent, or Firm* — Foley & Lardner LLP

(57) ABSTRACT

A method performed by a controller of a solid-state drive (SSD) having an integrated circuit comprising the controller. The method comprises receiving from a host a request for read data stored in a non-volatile semiconductor storage device of the SSD. The method also comprises determining if a capacity of internal memory of the integrated circuit is less than a predetermined fraction of its total capacity. Then the method comprises throttling a read-out rate used by the controller to retrieve data from the non-volatile semiconductor storage device if the capacity of internal memory of the integrated circuit is less than a predetermined fraction of its total capacity. The method then comprises retrieving the read data for storage in the internal memory using the throttled read-out rate.

20 Claims, 6 Drawing Sheets

THROTTLING NAND READ-OUTS FOR IMPROVED HOST READ PERFORMANCE

FIELD

The present disclosure relates to solid-state drives (SSD) and methods for optimizing processing of read requests from a host so as to reduce read latency and improve performance.

BACKGROUND

A solid-state drive (SSD) generally has faster performance, is more compact, and is less sensitive to vibration or physical shock than a magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives. SSDs utilize physical memory cells that comprise non-volatile semiconductor storage devices, such as NAND memory devices, to store data. A system-on-chip (SoC) controller of an SSD manages the transfer of data between a host and the memory cells of the SSD. Writing data to and reading data from the physical memory cells of an SSD typically involves transferring data between a host external to the SSD and the nonvolatile semiconductor storage devices.

SSDs often employ buffers to handle the transfer of data by the SoC when processing a read request or a write request received from a host. Such buffers include a larger amount of slower external memory and a smaller amount of faster internal memory for managing data transfers between the host and the NAND memory devices. However, the use of internal memory over external memory when servicing host requests has implications on the performance of the SSD. For example, the use of slower external memory for storing read data when processing a read request increases the read latency seen by the host. This has a knock-on effect on other processes that wait for the read data from the SSD.

In the case of processing read commands, the time in which read data is provided to the host is dependent on the data transfer rate of the data bus connecting the host to the SSD as well as the speed of the buffer used when reading out data from the NAND memory devices. Generally, the internal memory is preferred for use as the NAND buffer to ensure fast data transfers. However, the internal memory has a small capacity. Further, when the data read-out rate from the NAND memory device to the internal memory is higher than the data transfer rate of the bus between the host and the SSD, read data in the internal memory does not drain out to the host as quickly as it builds up within the internal memory. This leads to the data in the internal memory overflowing into the slower external memory. Draining read data in the external memory to the host is a slower process. This contributes to an increase in read latency of the SSD as seen by the host. The power consumption in processing a read request involving both internal and external memories would also increase. There is therefore a long felt need for optimized data transfers between a host and an SSD which reduce power consumption and reduce latency.

SUMMARY

According to an embodiment of the present disclosure, there is provided a method performed by a controller of a solid-state drive (SSD) having an integrated circuit comprising the controller. The method comprises receiving from a host a request for read data stored in a non-volatile semiconductor storage device of the SSD. The method also comprises determining if a capacity of internal memory of the integrated circuit is less than a predetermined fraction of its total capacity. Then the method comprises throttling a read-out rate used by the controller to retrieve data from the non-volatile semiconductor storage device if the capacity of internal memory of the integrated circuit is less than a predetermined fraction of its total capacity. The method then comprises retrieving the read data for storage in the internal memory using the throttled read-out rate.

According to another embodiment of the present disclosure, there is provided an SSD comprising a non-volatile semiconductor memory device comprising a plurality of memory dies for storing data. The SSD also comprises an integrated circuit comprising a controller and an internal memory. The controller is configured to receive from a host a request for read data stored in a non-volatile semiconductor storage device of the SSD. The controller is also configured to determine if a capacity of internal memory of the integrated circuit is less than a predetermined fraction of its total capacity. The controller then throttles a read-out rate used by the controller to retrieve data from the non-volatile semiconductor storage device if the capacity of internal memory of the integrated circuit is less than a predetermined fraction of its total capacity. Next, the controller retrieves the read data for storage in the internal memory using the throttled read-out rate.

In certain implementations, throttling comprises reducing the read-out rate. In some implementations, the method comprises throttling the read-out rate when an available portion of the internal memory is less than a predetermined threshold. In other implementations, the method comprises providing the read data directly from the internal memory to the host. In certain implementations, the method comprises determining if the read data is stored in single or dual logical clusters in the non-volatile semiconductor storage device, and either (i) maintaining the read-out rate at a default value, or (ii) applying a reduced degree of throttling to a read-out rate, if the read data is stored in single or dual logical clusters.

In some implementations, the method comprises counting a number of logical storage units available in the internal memory, and generating a throttled read-out rate based on the count. In other implementations, the method comprises storing the throttled read-out rate and the count in a register within the controller. In certain implementations, the method comprises retrieving the read data for storage in the internal memory using a default read-out rate without throttling if the capacity of the internal memory is not less than a predetermined fraction of its total capacity. In some implementation, the throttled read-out rate used by the controller to retrieve read data from the non-volatile semiconductor storage device is less than the rate at which the read data is provided to the host. In other implementations, the request contains a logical address of the non-volatile semiconductor storage device in which the read data is stored.

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
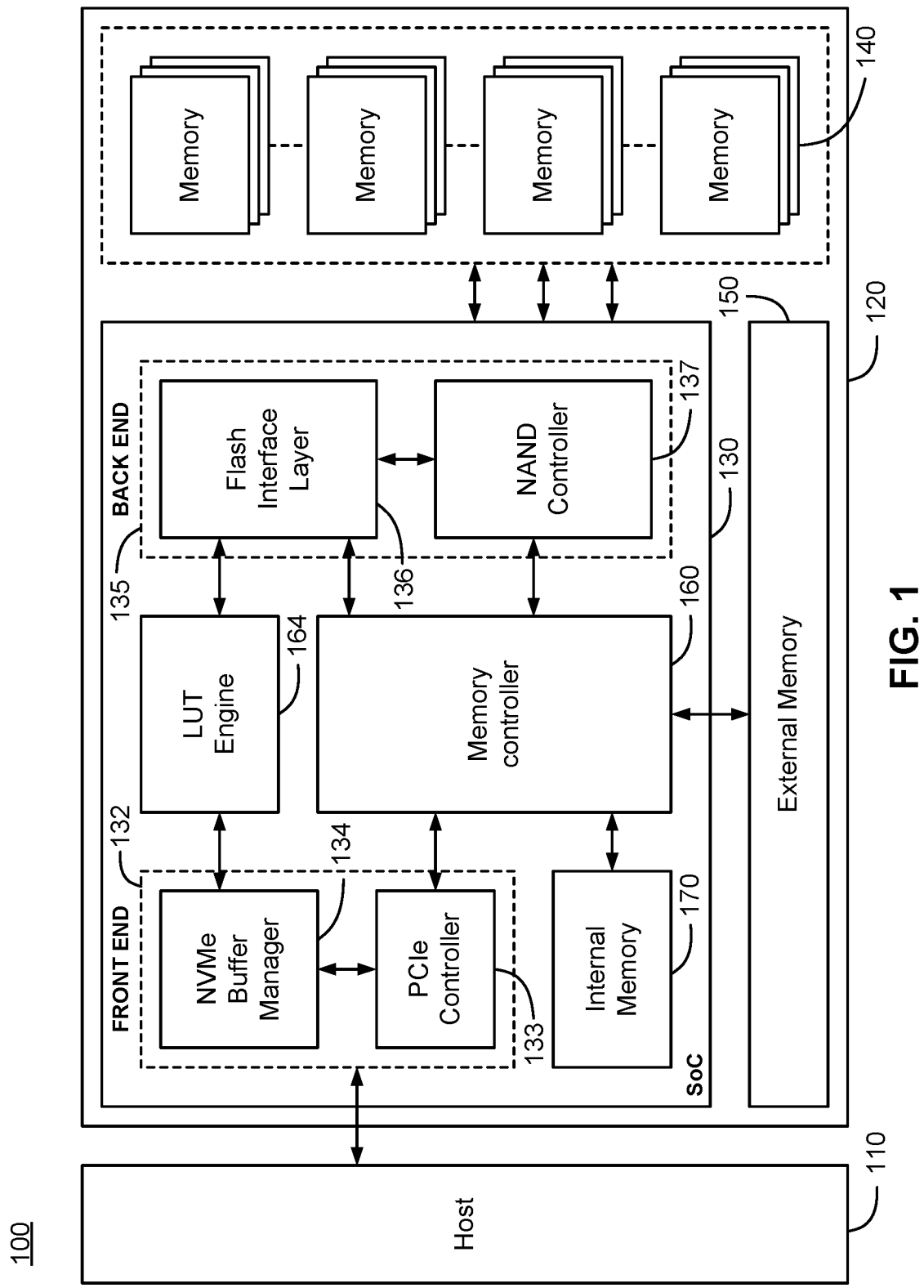
FIG. 1 illustrates a schematic representation of an SSD, configured according to one or more embodiments of the present disclosure.

To provide an overall understanding of the devices described herein, certain illustrative embodiments will be described. Although the embodiments and features described herein are specifically described for use in connection with an SSD having a controller, it will be understood that all the components and other features outlined below may be combined with one another in any suitable manner and may be adapted and applied to other types of SSD memory architectures having a similar need to throttle read-out rates to improve latency of the SSD, among other benefits readily recognizable by person of ordinary skill in the art.

For a SSD with a hybrid memory system consisting of a larger amount of slower external memory and a smaller amount of faster internal memory, it is desirable for achieving good read performance that host read data should always reside within the internal memory. The present disclosure dynamically throttles the rate at which data is read-out from the NAND die based on the sampled fill state of the internal memory available for read-out data with the aim of minimizing the chance of any overflow into external memory, which would reduce performance. With a limited and relatively small amount of fast internal memory available for read data, increasing the amount of external memory available for read data can improve performance for some host traffic profiles. The increased amount of memory allows read commands to be started on more NAND die in parallel, while still maintaining a guarantee that memory will be available to accommodate the data at read-out time, thus increasing the rate at which read data becomes available from the NAND memory. For some traffic profiles the combinations of throughput and latency within the system can cause an overflow of read data into the slower external memory at read-out time if too much external memory is made available for processing read commands.

The amount of external memory that is configured to be available to read traffic cannot typically be varied as the host traffic profile varies and so may result in read-out data overflowing into the external memory for some profiles and causing poor performance. If overflow into external memory occurs, a large drop in performance in seen immediately as the read-out rate is limited by the total external memory bandwidth. Also, the buffer drain rate is reduced as the PCIe™ transfer rate is also limited by the total external memory bandwidth. NAND read-out and PCIe™ transfer to the host compete for the total external memory bandwidth and are thus both reduced compared to using internal memory.

By gradually reducing the NAND read-out rate as the internal memory approaches being full, the memory fill rate can be adjusted to closely match that value which can be supported by the memory drain rate via PCIe™ transfer of the read data to the host. Importantly the PCIe™ drain rate is not reduced due to having to read the data from external memory. An optimal performance for a wide range of read traffic profiles can thus be achieved. The throttling algorithm will ideally reduce the read-out rate by the smallest amount necessary to prevent overflow, while keeping the amount of unused internal memory available for reads at the smallest possible amount.

The present disclosure provides a method performed by a controller of a solid-state drive (SSD) having an integrated circuit comprising the controller. The method comprises receiving from a host a request for read data stored in a non-volatile semiconductor storage device of the SSD. The method also comprises determining if a capacity of internal memory of the integrated circuit is less than a predetermined fraction of its total capacity. Then the method comprises throttling a read-out rate used by the controller to retrieve data from the non-volatile semiconductor storage device if the capacity of internal memory of the integrated circuit is less than a predetermined fraction of its total capacity. The method then comprises retrieving the read data for storage in the internal memory using the throttled read-out rate. This drastically reduces read latency in the SSD, thereby improving the read performance of the device.

FIG. 1 is a block diagram of a memory system 100 comprising at least one host 110 in communication with a storage device 120. The host 110 is a computing system that comprises processors, memories, and other components as is generally known in the art, and which is not shown in FIG. 1 for the sake of brevity. Storage device 120 provides non-volatile storage and retrieval functionality for use by the host 110. Storage device 120 may include an integrated circuit comprising a controller communicatively coupled to a memory array. Such an integrated circuit may comprise a system-on-chip (SoC) 130. SoCs are advantageous as they provide a single integrated circuit that contains circuitry and components of the electronic system for the storage device 120 to function. SoC 130 may be communicatively coupled to a memory 140. Memory 140 may comprise an array of NAND semiconductor memory, such as a NAND based flash memory device. The memory 140 may be organized into pages, blocks, clusters, planes, die and chips. Memory 140 may comprise a plurality of NAND chips, such as, for example, 32, 64, 128, 256 separate NAND chips, and each NAND chip may be running separate read or write commands on individual die (not shown) within the chip. In the case of read commands, for example, the lack of coherence between read command queues accessing the memory 140 may cause varying amounts of collisions between read commands at the NAND die even when each read command queue maintains a consistent traffic profile.

Storage device 120 may include a memory external to the SoC 130, such as a dynamic random access memory ("DRAM") 150. However, a person of ordinary skill in the art would understand that other types of external memory such as static random access memory ("SRAM") or other suitable alternatives can be employed without departing from the scope of the present disclosure. External memory 150 comprises several buffers used to temporarily store data during read and write operations between the host 110 and the memory 140. However, the external memory 150 is slower than the internal memory 170, and thus use of the external memory 150 in read operations generally leads to a large reduction in performance.

Also shown in FIG. 1 is a memory controller 160 that enables the storage device 120 to perform various functions such as processing of read and write commands received from the host 110 as well as internal NVMe™ commands generated within the storage device 120 to maintain functionality. The storage device 120 may include a Read-Only Memory (ROM) that stores firmware for the operation of various states of the storage device 120. The firmware comprises computer executable instructions that are executed by the controller 160 for operation of the storage device 120. The storage device 120 also includes an internal memory 170, such as a static random access memory ("SRAM"), for example, which forms part of the same integrated circuit as the SoC 130. The internal memory 170 may be configured to store operational data such system metadata, mapping tables, NAND read-out rates and throttle thresholds, as well as data read from NAND memory clusters responsive to a host read request.

Storage device 120 may also comprise a front end host interface 132 which enables communication with the host 110 for the receipt of I/O commands such as read commands. Additionally, storage device 120 may include a back end memory interface 136 for communication with the memory 140 through a plurality of channels. Front end host interface 132 on the SoC 130 may comprise a Serial Advanced Technology Attachment (SATA) connector or a NVMe™ connector (NVMe™ is an acronym for "NVM express," where "NVM" stands for "nonvolatile memory") operating with a PCIe™ ("Peripheral Component Interface Express") controller 133 and bus, for example. The PCIe™ controller 133 enables data transfer between host 110 and storage device 120 at a particular data transfer rate (e.g. 250 MB/s for PCIe™ 1.1, 500 MB/s for PCIe™ 2.0, and 1 GB/s for PCIe™ 3.0). These data transfer rates are specific to the generation of PCIe™ technology used and cannot be fixed. PCIe™ controller 133 facilitates the provision of data retrieved from NAND memory 140 to host 110 in response to a read request from host 110 at the above exemplified PCIe™ data transfer rates. Further, PCIe™ controller 133 facilitates storage of data from host 110 to NAND memory 140 in response to a write request from host 110. Front end 132 may also include a NVMe™ buffer manager 134 that parses logical addressing information contained in the host command for translation into physical address information for accessing the NAND memory 140.

Back end memory interface circuitry 135 may comprise an Open NAND Flash Interface (ONFI) or a manufacturer's proprietary interface, for example. Back end circuitry 135 may comprise, for example, an interface according to, but not limited to: a Double Data Rate (DDR) memory bus standard such as DDR3, DDR4 or DDR5, a Low Power Double Data rate (LPDDR) memory bus standard such as LPDDR3, LPDDR4 or LPDDR5; a Hybrid Memory Cube (HMC) memory bus standard. Back end circuitry 135 includes a flash interface layer (FIL) 136 in communication with a NAND controller 137. NAND controller 137 interacts with NAND memory 140 via data channels. In one implementation, FIL 136 communicates with a LUT engine 164 in SoC 130 to facilitate the processing of read and write commands received from host 110. When processing read commands, for example, a logical block address (LBA) specified by the host 110 in a read command is used to index into a logical-to-physical look up table (LUT) in LUT engine 164. The LUT engine 164 then provides to FIL 136 a physical block or cluster address in the NAND memory 140 from which data is to be read. FIL 136 provides this physical address to the NAND controller 137 which then issues low-level commands to NAND memory 140 for data readout.

It should be understood that a 'read buffer' used to store data read-out from NAND memory 140, as referred to herein, may comprise a combination of at least a portion of internal memory 170 and, optionally, at least a portion of external memory 150. External memory 150 has a relatively small bandwidth, is larger in capacity, and slower at data transfer than internal memory 170. With a limited and relatively small amount of fast internal memory 170 available for read data, performance can be improved for some host read traffic profiles by utilizing some external slower memory 150 of which there is usually a large amount that could be made available for data read out from the NAND memory 140. The size of the portion of external memory 150 is selected such that an improvement in read throughput is seen by host 110. The amount of external memory 150 will also vary depending on the read command size (or the size of read data requested by host 110).

Figure 2:
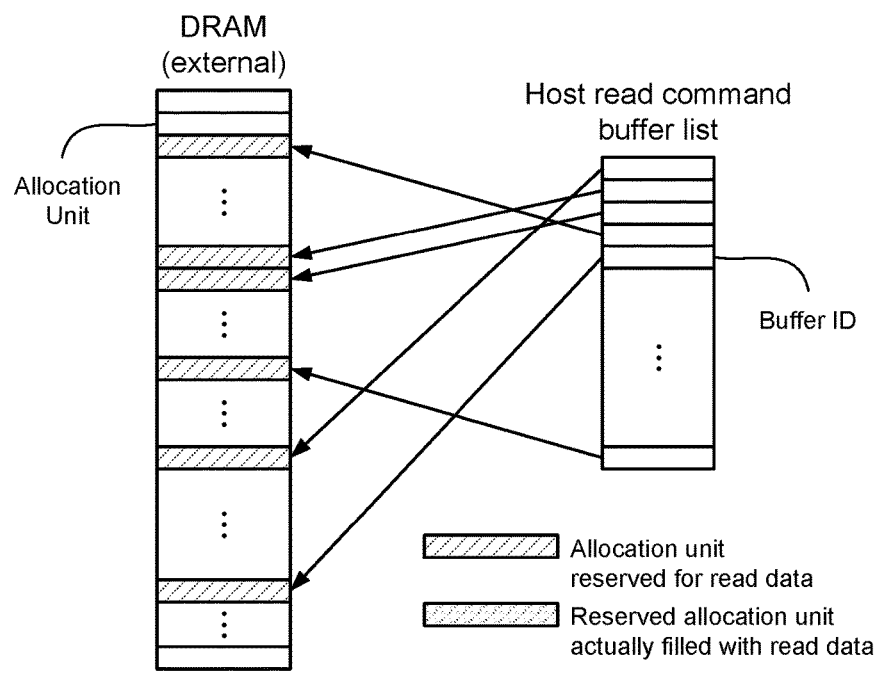
FIG. 2 illustrates exemplary mapping of host read commands onto allocation units of an external DRAM buffer of the SSD in FIG. 1.
Figure 3:
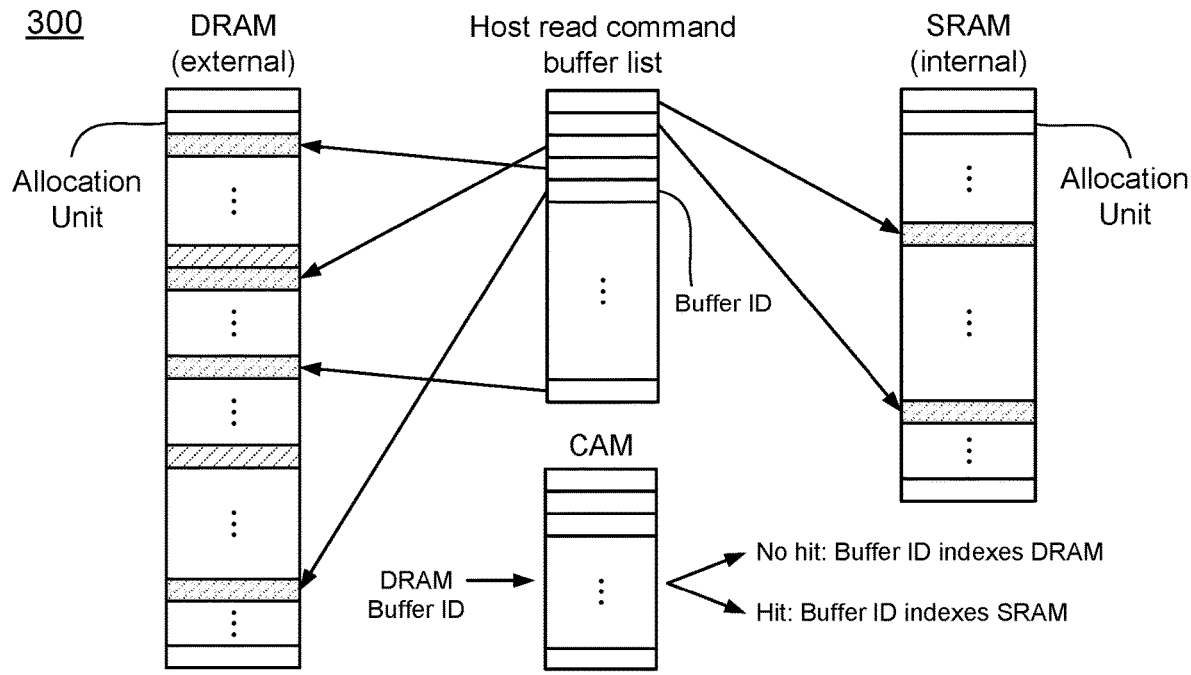
FIG. 3 illustrates an exemplary mapping of host read commands onto allocation units of an internal SRAM buffer as an alternative to or in addition to the external DRAM buffer in FIG. 2, according to one or more embodiments of the present disclosure.

FIGS. 2 and 3 illustrate the structure of the read buffer with respect to external memory 150 and internal memory 170 when a read command is received from host 110. In FIG. 2, the read buffer comprises external memory 150 only, while in FIG. 3, read buffer comprises external memory 150 and internal memory 170. When the read command is received, front end 132 determines the size of the read data described by the read command and whether there is space in external memory 150 provisioned for the read buffer. If there is space in external memory 150, controller 160 accepts the host read request and allocates read buffer space in the external memory 150 for the read data. Once read buffer space is allocated, front end 132 passes the LBA of each cluster within the read command to LUT engine 164, which looks-up the address in the NAND memory 140 of the relevant cluster containing the read data and passes that address to FIL 136. FIL 136 will make the decision as to when to schedule the read commands against NAND die in memory 140 based on the queue of cluster read requests that have accumulated from LUT engine 164. This can be seen in the setup 200 of FIG. 2 at the time when the host read command is accepted by SSD 120 where the buffer ID of each host read command is associated with a start address of an allocation unit in external memory 150.

When data read-out occurs from NAND memory 140, controller 160 may determine that there is sufficient space in the faster internal memory 170 to hold the read data. Such just-in-time allocation is shown in the setup 300 of FIG. 3 where the buffer ID of certain read commands are associated with a start address of an allocation unit in internal memory 170 instead of the slower external memory 150, and those allocation units in the internal memory 170 are actually filled the data read out from NAND memory 140. This is especially the case for smaller data associated with read commands that involve single or dual cluster data (4 KB to 8 KB), for example. A content-addressable memory (CAM) is internal to memory controller 160 and used to decipher any overlay of host command buffer IDs with external memory allocation units and internal memory allocation units. CAM is a type of memory that compares input search data against a table of stored data and returns address of matching data. In relation to FIG. 3, CAM receives as input a query with the host command buffer ID. If there is a hit, the CAM addresses the internal memory 170 for storage of data read out from NAND memory 140. If there is no hit, the CAM addresses the external memory 150 for storage of data read out from NAND memory 140.

However, the amount of external memory 150 available for read commands cannot generally be varied based on the traffic profile of the host 110 and thus a compromise between the selected size of external memory 150 and the corresponding drop in performance due to the slow speed of external memory 150 for a range of expected host traffic profiles must be carefully made.

Variation in time of read throughput may be seen by the host 110 in the presence of multiple independent read command queues. This is because the lack of coherence between the read command queues may cause varying amounts of collisions between read commands at the NAND die in memory 140 even when each read command queue maintains a consistent traffic profile. To achieve good read performance during periods of more collisions a larger read buffer is useful as this allows NAND reads to be started on die that might otherwise be starved of commands. However, if such a larger read buffer is used during periods of fewer collisions, performance can be reduced due to the rate at which data is read-out from the NAND memory 140 to the read buffer being greater than the rate at which data can be drained from the read buffer via PCIe™ interface and returned to host 110. This causes the read-data to overflow from internal memory 170 into slower external memory 150 which reduces performance of SSD 120.

According to an embodiment of the present disclosure, this reduction in performance due to the use of external memory 150 to store read-data may be reduced or avoided by throttling (or reducing) the NAND read-out rate as the amount of available internal memory 170 approaches zero. Throttling may be triggered when the portion of available internal memory 170 falls below a predetermined start threshold. Throttling at the point of NAND read-out based on the fill level of internal memory 170 is advantageous as there is little in the way of feedback delay compared, for example, to sensing via an increase in visible command latency at host 110 and applying a throttle at the point of read command ingress from host 110 to SSD 120. By attempting to keep as much read data as possible in internal memory 170, the present disclosure reduces variations in read data throughput seen by host 110 as the host read traffic profile varies.

Further, the throttling start threshold and the reduction factor applied to the NAND read-out rate may be configurable depending on the size of read data involved when processing the respective read commands. For host traffic profiles with a mix of read command sizes and queue depths where there are some small randomly distributed host commands present within the mix, the throttling of the NAND read-out rate when the read is for only single or dual clusters of read data (4 KB to 8 KB) may increase the latency seen by host 110 for these small commands, without contributing much to avoiding overflow into external memory 150 as the bulk of the read data is due to the larger sequential traffic present in the mix. However, there is a potential issue if high rate random 4 KB to 8 KB host reads are the sole component of the host read traffic as this can cause overflow into external memory 150 for SSD device configurations that support multiple NAND die and fast NAND bus speeds. According to an implementation of the present disclosure, throttling of NAND read-out rate may exclude read traffic comprising single or dual cluster data where throttling is not triggered, or a small reduction factor in NAND read-out rate is applied, for small read data.

According to embodiments of the present disclosure, throttling of the read-out rate from NAND memory 140 to the NAND buffer begins to take effect once the available fraction of internal memory 170 drops below a threshold. Once below this threshold a linear reduction in read-put rate may be employed from the maximum read-out rate supported by the data channel between NAND memory 140 and SoC 130. The controller 160 determines this reduction factor at the point where no more internal memory 170 is available for data read-out from the NAND memory 140. Other throttling techniques may be used to similarly maximize usage of internal memory 170 while preventing overflow of read data into the slower external memory 150.

Figure 4A:
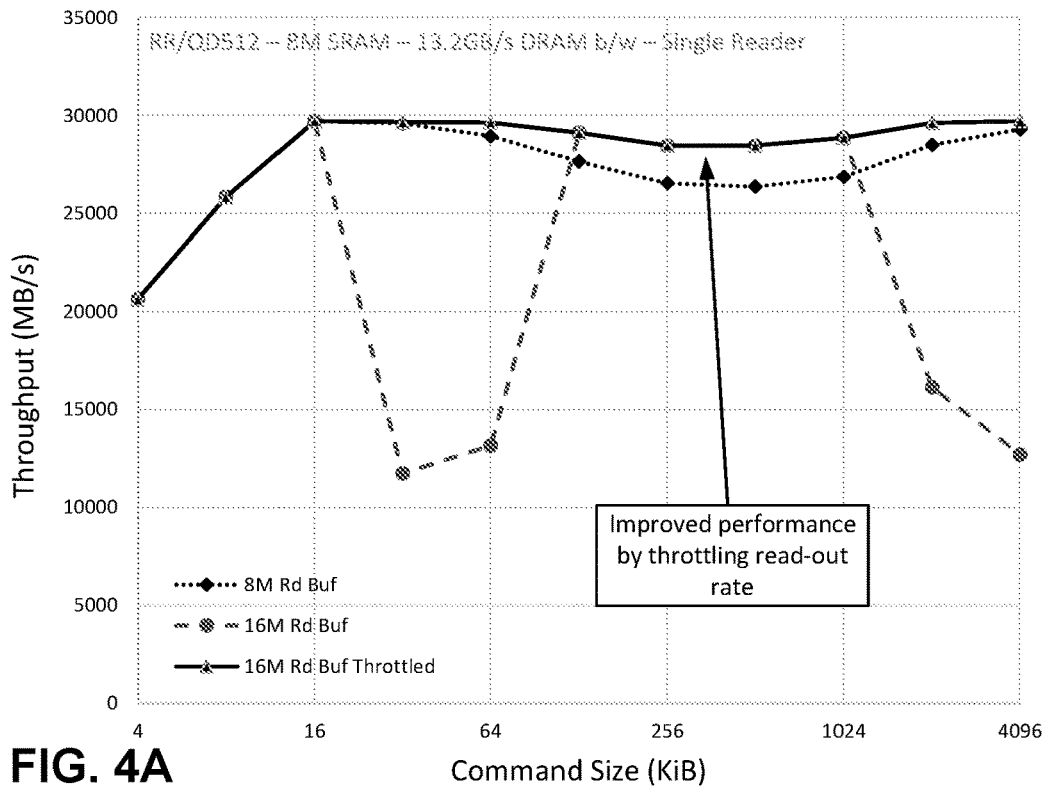
FIG. 4A and FIG. 4B provide exemplary comparative performance data of the SSD in FIG. 1 with and without throttling the NAND read-out rate for various random and sequential read command sizes for single read queues, according to one or more embodiments of the present disclosure.
Figure 4B:
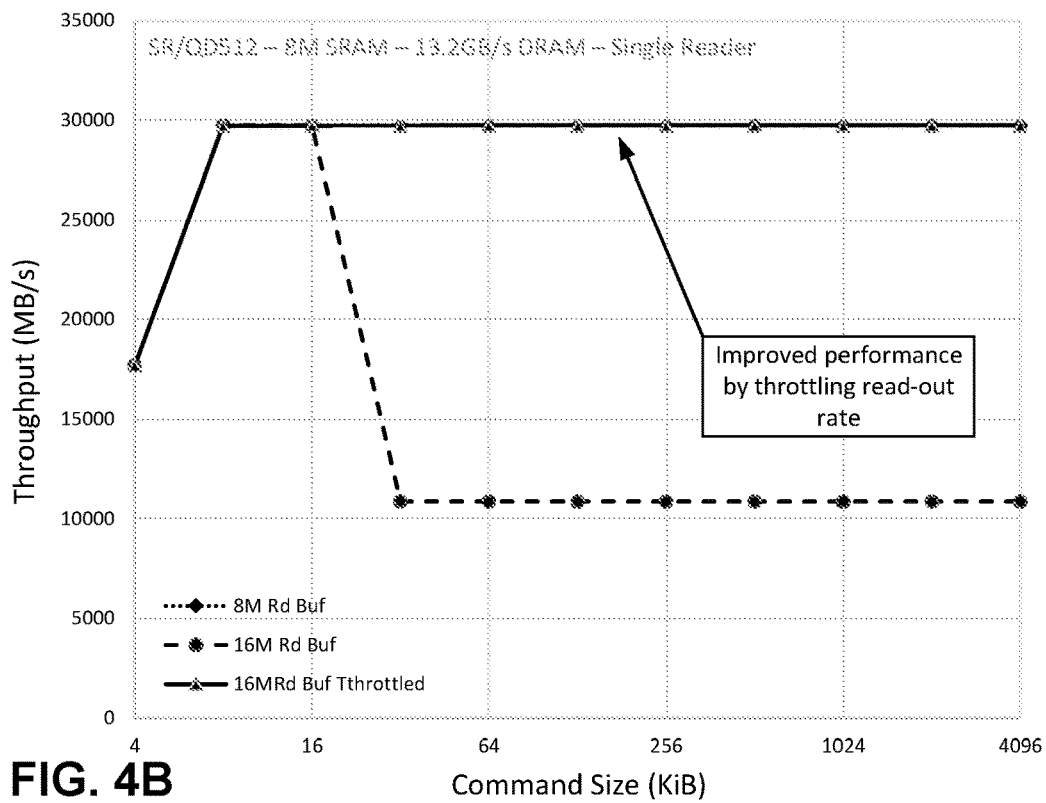

FIGS. 4A and 4B illustrate the effects of throttling the read-out rate from a NAND memory for host random read and host sequential read commands, respectively. The reduction in read-out rate has been modelled by adding a delay between each read-out from NAND memory 140. As NAND read-outs can include anywhere from one to four 4K clusters of data, dependent on the host traffic profile, the delay has been modified by the count of clusters in the read-out to produce an average read-out rate per cluster. The average read-out rate per cluster is chosen to achieve a desired throttled read-out rate. As the modelled throttle takes effect on a direct measure of the remaining internal memory 170 for reads and acts directly on the next page read out from NAND memory 140, the latency within the control loop is made as short as possible.

FIGS. 4A and 4B shows the modelled throughput of a single host reader with 8 MB of SRAM available for host read data as host command size varies. As can be seen, a 8 MiB (mega binary byte) read buffer provides sequential read performance that saturates a PCIe™ 6.0×4 bus for host command sizes of 8 KiB and greater, but the random read performance is significantly lower than this for intermediate-size host commands. Using a larger read buffer of 16 MiB improves the random read performance for some command sizes, but significantly reduces performance for others as read data overflows into external DRAM. The sequential read performance with this larger buffer causes overflow into external DRAM and a large drop in performance for all command sizes above 16 KiB. By using the aforementioned read-out throttling as described in the present disclosure, the larger 16 MiB read buffer can be used to boost random read performance for intermediate size read commands, while not reducing the performance for other random read command sizes. For sequential reads the performance with the larger 16 MiB read buffer with throttling remains unchanged from the throughput achieved with the smaller 8 MiB buffer size that matches the 8 MB size of the internal SRAM. The simulation results in FIGS. 4A and 4B illustrate the increase in throughput to the host once the read-out rate of the NAND memory is throttled as read command sizes increase. Also shown is the consistency of performance (30 GB/s throughput) of the SSD in processing read commands achieved with throttling the NAND read-out rate for read command sizes above 16 MiB.

Figure 5:
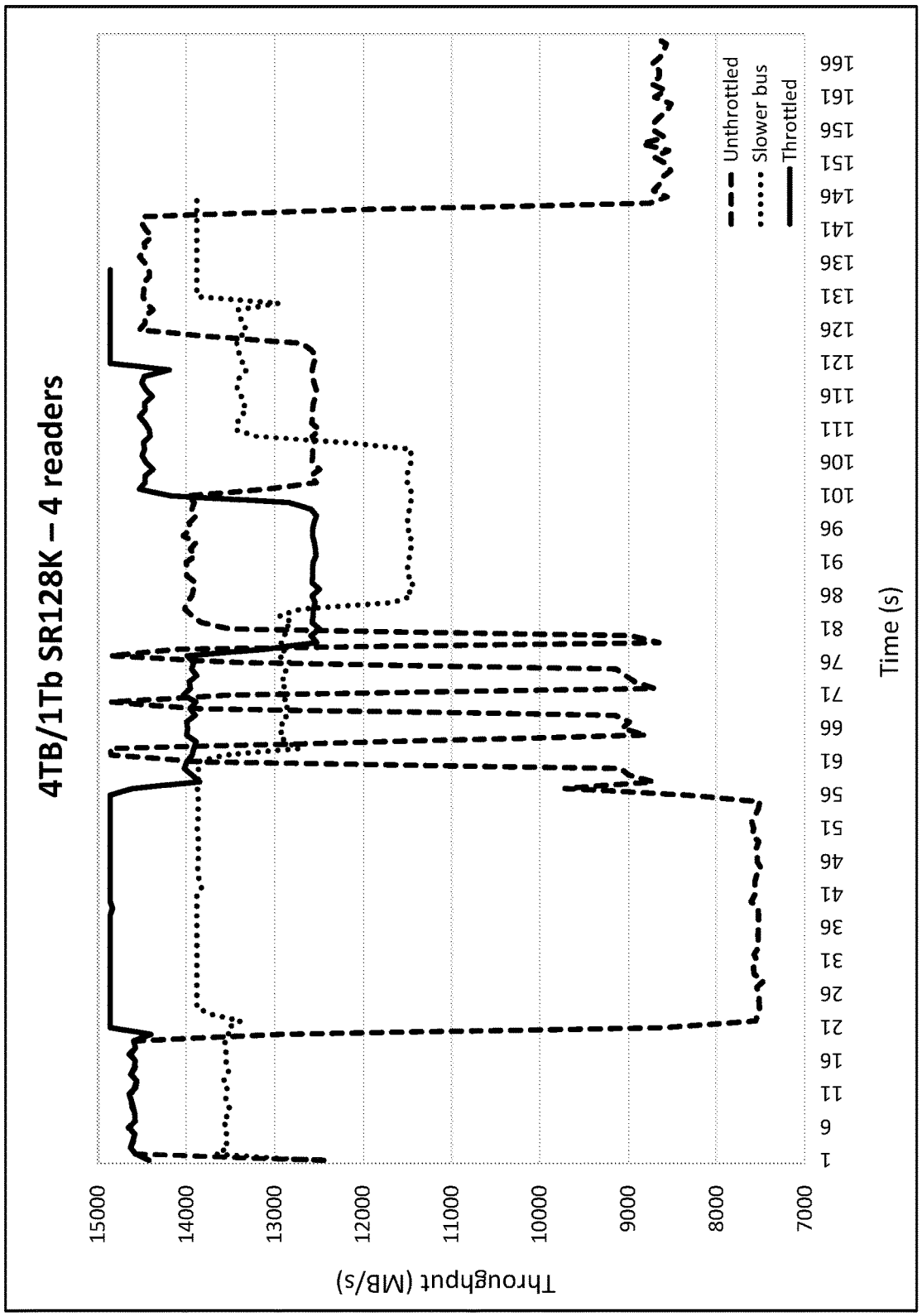
FIG. 5 provides exemplary comparative performance data of the SSD in FIG. 1 with and without throttling the NAND read-out rate for various random and sequential read command sizes for multiple read queues, according to one or more embodiments of the present disclosure.

FIG. 5 illustrates the modelled throughput of four concurrent uncorrelated sequential host read command queues. The same read traffic was presented to the model for three scenarios: unthrottled, slower NAND bus speed, and throttled NAND read-out rate. The total read data transferred is the same for all scenarios. Due to the different throughput during the periods of low and high collisions, the offsets along the time axis at which these periods occur are different on each plot. When there are fewer collisions between read command queues the NAND read-out rate can increase to the point that overflow occurs into the slower external memory resulting in lower performance, as can be seen by the low throughput of about 7.50 GB/s for the unthrottled scenario.

Statically restricting the NAND bus speed can prevent overflow when collisions are low, but also reduces performance for those periods where collisions are somewhat higher and the full NAND read-out bandwidth could otherwise be utilized. As seen from FIG. 5, periods of higher performance in the unthrottled scenario have somewhat lower performance in the scenario with the slower bus (see throughput between 5 and 15 sec). The periods of low performance due to fewer collisions between host read queues causing overflow in the unthrottled scenario (see throughput between 25 and 45 sec) can be seen to have good performance in the slower bus scenario, which is also slightly better than the performance seen during the periods of higher collisions (see throughput between 5 and 15 sec) in the slower bus scenario. Throttling the NAND read-out rate as detailed in the aforementioned description avoids overflow of the internal SRAM and also maximizes performance when collisions are high enough that overflow cannot occur (see throughput between 5 and 15 sec for throttled scenario).

Figure 6:
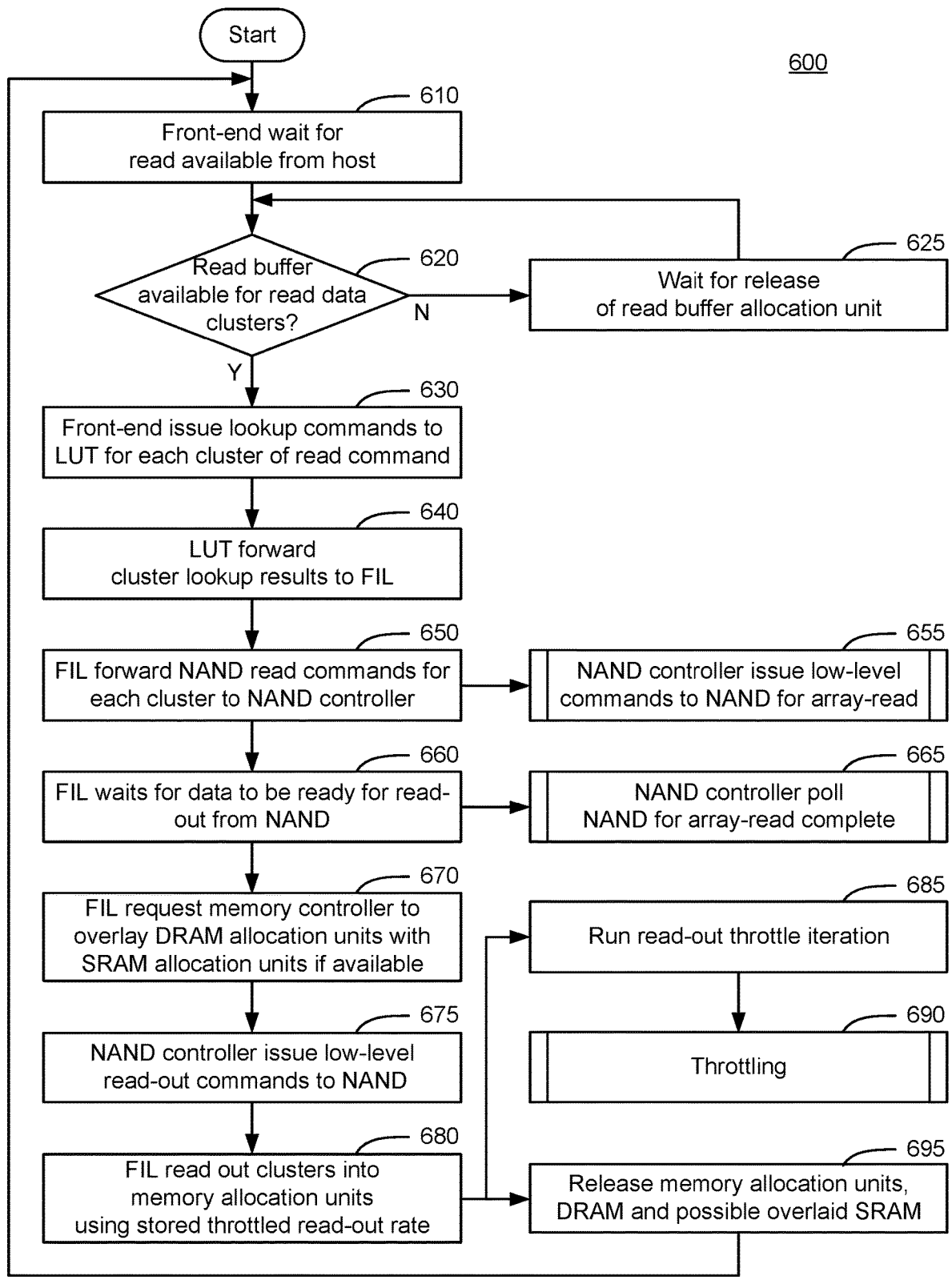
FIG. 6 is a flow diagram of a method for processing a host read command by throttling the NAND read-out rate, according to one or more embodiments of the present disclosure.

FIG. 6 illustrates an exemplary flow diagram of a method 600 of processing a read command received by the SSD 120 from a host 110, according to an embodiment of the present disclosure. Method 600 relates to an improvement on the throughput of the SSD 120 in processing read commands by throttling the read-out rate of data from the NAND memory 140 such that the read data does not overflow from the internal SRAM 170 to the slower external DRAM 150, as described above.

Method 600 begins at step 610 where front end 132 waits for a read command from host 110. Once a read command is received, controller 160 determines in step 620 if a read buffer is available for the read data clusters as identified in the read command. If the read buffer is unavailable to hold the read data clusters ('N' at step 620), controller 160 waits. If the read buffer is available to hold the read data clusters ('Y' at step 620), front end 132 issues lookup commands to LUT engine 164 for each cluster of read commands (step 630). Next, in step 640, LUT engine 164 forwards the cluster lookup results to FIL 136 in back end 135. FIL 136 then forwards the NAND read commands for each cluster to NAND controller 137 (step 650). Here NAND controller 137 issues low-level commands to NAND memory 140 for an array-read (step 655). FIL 136 then waits for data to be ready for read-out from the NAND memory 140 (step 660). NAND controller 137 polls the NAND memory 140 for an array-read complete signal in step 665.

Figure 7:
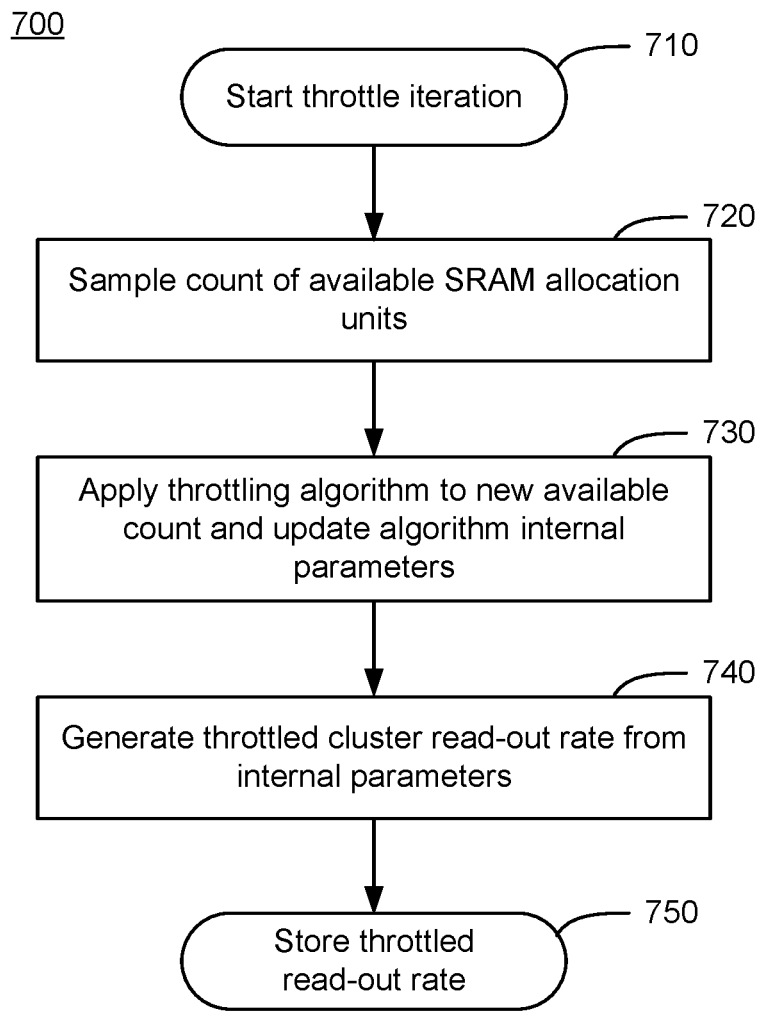
FIG. 7 is a flow diagram of a method for determining a degree of throttling to be applied when processing the host read command of FIG. 6, according to one or more embodiments of the present disclosure.

Next, FIL 136 requests memory controller 160 to overlay allocation units in the DRAM (external memory 150) with allocation units in the SRAM (internal memory 170), per step 670. The NAND controller 137 then issues low-level read-out commands to NAND memory 140 (step 675). FIL 136 then performs a read-out of clusters into memory allocation units using a stored throttled read-out rate (step 680). The controller also runs a read-out throttle iteration in step 685, involving throttling of the read-out rate (step 690), described in FIG. 7. Next, in step 695, the memory allocation units in the DRAM and possible overlaid SRAM are released.

A read-out throttle iteration may occur when the available capacity of internal memory 170 falls below a predetermined fraction of its total capacity. The throttle iteration begins in step 710. Here the controller performs a sample count of the available SRAM allocation units in step 720. A throttling algorithm is then applied to the new available count in step 730, where internal parameters of the throttling algorithm are updated. Next in step 740 a throttled cluster read-out rate is generated from the internal parameters. The throttle read out rate is then stored (step 750) for use in the next iteration of the process 600 beginning at step 610.

As seen in the foregoing, by throttling the NAND read-out rate as the capacity of internal memory 170 falls below a predetermined fraction of its total capacity, the internal memory fill rate can be adjusted to closely match that value which can be supported by the memory drain rate via PCIe™ transfer of the read data to the host. This minimizes the chance of any overflow into external memory, and thus improves performance.

In the foregoing, all recitation of "manager" and "engine" should be taken to mean a plurality of circuits within the controller that facilitates the function as described. Such circuits may comprise electronic components formed on a semiconductor chip, such as, for example, transistors and resistors. It should be noted that the term "about" or "approximately" in the foregoing indicates a range of ±20% of the stated value. Additionally, in the foregoing, all recitation of "command," "action," "operation" or "function" should be taken to be based on algorithms and instructions stored on a non-transitory computer-readable medium, that, when executed by a processor, causes a controller of an integrated circuit of a solid-stated drive (SSD) to perform the command, action, operation or function. All recitation of "device," "memory," "array" and "dies" are used interchangeably when used in relation to the NAND non-volatile semiconductor memory device. The term "similar" as used herein indicates close to identical but for a stated difference.

Other objects, advantages and embodiments of the various aspects of the present invention will be apparent to those who are skilled in the field of the invention and are within the scope of the description and the accompanying drawings. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method performed by a controller of a solid-state drive (SSD) having an integrated circuit comprising the controller, the method comprising:
  receiving from a host a request for read data stored in a non-volatile semiconductor storage device of the SSD;
  determining if an available capacity of internal memory of the integrated circuit is less than a predetermined fraction of its total capacity;
  throttling a read-out rate used by the controller to retrieve data from the non-volatile semiconductor storage device if the available capacity of internal memory of the integrated circuit is less than the predetermined fraction of its total capacity;

determining a size of the read data associated with the request; and retrieving the read data for storage in the internal memory using the throttled read-out rate only if the available capacity of internal memory of the integrated circuit is less than the predetermined fraction of its total capacity and the size of the read data is above a specified size.

2. The method of claim 1, wherein throttling comprises reducing the read-out rate.

3. The method of claim 1, further comprising:
throttling the read-out rate when an available portion of the internal memory is less than a predetermined threshold.

4. The method of claim 1, further comprising:
providing the read data directly from the internal memory to the host.

5. The method of claim 1,
wherein the specified size corresponds to single or dual logical clusters in the non-volatile semiconductor storage device; and
wherein if the size of the read data is at or below the specified size, retrieving the read data is performed at either (i) a default value of the read-out rate, or (ii) a read-out rate that is faster than the throttled read-out rate.

6. The method of claim 1, further comprising:
counting a number of logical storage units available in the internal memory; and
generating a throttled read-out rate based on the count.

7. The method of claim 6, further comprising:
storing the throttled read-out rate and the count within the controller for a subsequent read iteration.

8. The method of claim 1, further comprising:
retrieving the read data for storage in the internal memory using a default read-out rate without throttling if the capacity of the internal memory is not less than a predetermined fraction of its total capacity.

9. The method of claim 1, wherein the throttled read-out rate used by the controller to retrieve the read data from the non-volatile semiconductor storage device is less than the rate at which the read data is provided to the host.

10. The method of claim 1, wherein the request contains a logical address of the non-volatile semiconductor storage device in which the read data is stored.

11. A solid-state drive (SSD) comprising:
a non-volatile semiconductor memory device comprising a plurality of memory dies for storing data; and
an integrated circuit comprising a controller and an internal memory, the controller configured to:
receive from a host a request for read data stored in a non-volatile semiconductor storage device of the SSD;
determine if an available capacity of internal memory of the integrated circuit is less than a predetermined fraction of its total capacity;
throttle a read-out rate used by the controller to retrieve data from the non-volatile semiconductor storage device if the available capacity of internal memory of the integrated circuit is less than the predetermined fraction of its total capacity;
determine a size of the read data associated with the request; and
retrieve the read data for storage in the internal memory using the throttled read-out rate only if the available capacity of internal memory of the integrated circuit is less than the predetermined fraction of its total capacity and the size of the read data is above a specified size.

12. The SSD of claim 11, wherein throttling comprises reducing the read-out rate.

13. The SSD of claim 11, wherein the controller is further configured to:
throttle the read-out rate when an available portion of the internal memory is less than a predetermined threshold.

14. The SSD of claim 11, wherein the controller is further configured to:
provide the read data directly from the internal memory to the host.

15. The SSD of claim 11,
wherein the specified size corresponds to single or dual logical clusters in the non-volatile semiconductor storage device; and
wherein if the size of the read data is at or below the specified size, the controller is further configured to retrieve the read data is performed at either (i) a default value of the read-out rate, or (ii) read-out rate that is faster than the throttled read-out rate.

16. The SSD of claim 11, wherein the controller is further configured to:
count a number of logical storage units available in the internal memory; and
generate a throttled read-out rate based on the count.

17. The SSD of claim 16, wherein the controller is further configured to:
store the throttled read-out rate and the count within the controller for a subsequent read iteration.

18. The SSD of claim 11, wherein the controller is further configured to:
retrieve the read data for storage in the internal memory using a default read-out rate without throttling if the capacity of internal memory of the integrated circuit is not less than a predetermined fraction of its total capacity.

19. The SSD of claim 11, wherein the request contains a logical address of the non-volatile semiconductor storage device in which the read data is stored.

20. The SSD of claim 11, wherein the throttled read-out rate used by the controller to retrieve the read data from the non-volatile semiconductor storage device is less than the rate at which the read data is provided to the host.

* * * * *